(12) United States Patent  
Lievens et al.

(10) Patent No.: US 9,025,009 B2  
(45) Date of Patent: May 5, 2015

(54) METHOD AND SYSTEMS FOR OBTAINING AN IMPROVED STEREO IMAGE OF AN OBJECT

(75) Inventors: Sammy Lievens, Brasschaat (BE); Donny Tytgat, Ghent (BE); Jean-Francois Macq, Ganshoren (BE); Maarten Aerts, Beveren-Waas (BE)

(73) Assignee: Alcatel Lucent, Boulogne Billancourt (FR)

(*) Notice: Subject to any disclaimer, the term of this patent is extended or adjusted under 35 U.S.C. 154(b) by 471 days.

(21) Appl. No.: 13/509,666

(22) PCT Filed: Nov. 23, 2010

(86) PCT No.: PCT/EP2010/068044  
§ 371 (c)(1),  
(2), (4) Date: Aug. 24, 2012

(87) PCT Pub. No.: WO2011/067141  
PCT Pub. Date: Jun. 9, 2011

(65) Prior Publication Data  
US 2012/0307017 A1    Dec. 6, 2012

(30) Foreign Application Priority Data

Dec. 4, 2009  (EP) ..................................... 09306183

(51) Int. Cl.  
*H04N 13/02* (2006.01)  
*H04N 13/00* (2006.01)

(52) U.S. Cl.  
CPC ........ *H04N 13/0239* (2013.01); *H04N 13/0022* (2013.01); *H04N 13/0242* (2013.01); *H04N 13/0246* (2013.01)

(58) Field of Classification Search  
CPC .......... H04N 13/0239; H04N 13/0242; H04N 2013/0081; H04N 13/0055; H04N 13/0059; H04N 13/0048; G06T 2207/10012; G06T 7/0075; G06T 7/0022; G03B 35/00  
USPC .................. 348/42, 46–48; 352/86; 359/462; 396/324; 382/154, 106, 285; 356/12

IPC ............................................. H04N 13/00,13/02  
See application file for complete search history.

(56) References Cited

U.S. PATENT DOCUMENTS 5,063,441 A    11/1991  Lipton et al.  
5,577,130 A    11/1996  Wu (Continued)

FOREIGN PATENT DOCUMENTS

CN    101282492    10/2008  
JP    2004093457    3/2004

(Continued)

OTHER PUBLICATIONS

Feldman, Schreer, Kauff; Nonlinear Depth Scaling for Immersive Video Applications; Proc. of 4th Int. Workshop on Image Analysis for Multimedia Interactive Services; Apr. 9, 2003; pp. 433-438; XP002581663; London; Retrieved from internet: URL:http//ip.hhi.de/imedia_G3/assets/pdfs/wiams03_depthscal.pdf; retrieved on May 7, 2010.  
E. H. Adelson; J. R. Bergen; The Plenoptic Function and the Elements of Early Vision; Computational Models of Visual Processing, XX, XX, Jan. 1, 1991; pp. 3-20; XP000934213.

(Continued)

*Primary Examiner* — Sherrie Hsia  
(74) *Attorney, Agent, or Firm* — Patti & Malvone Law Group, LLC

(57) ABSTRACT

An exemplary technique is provided for obtaining an improved depth precision for a stereo image of an object of interest. The technique includes imaging a first image of the object of interest from a first position, imaging a second image of the object of interest from a second position different from the first position, determining a rough estimate of a depth for the object of interest based on the first image and the second image, determining an improved set of imaging positions corresponding to an improved depth precision for the object of interest based on the rough estimate of the depth, imaging improved images from the improved set of imaging positions, and determining an improved depth based on the improved images.

15 Claims, 5 Drawing Sheets

(56) References Cited

U.S. PATENT DOCUMENTS

2010/0225745 A1* 9/2010 Chen et al. .............. 348/49
2012/0120200 A1* 5/2012 Newton et al. ........... 348/46
2013/0010079 A1* 1/2013 Zhang et al. ............. 348/47

FOREIGN PATENT DOCUMENTS

| JP | 2005514606 | 5/2005 |
|----|------------|--------|
| WO | 03/058158  | 7/2003 |

OTHER PUBLICATIONS

L. McMillan; G. Bishop; Plenoptic Modeling: An Image-Based Rendering System; Computer Graphics Proceedings; Los Angeles, Aug. 6-11, 1995; New York, IEEE, US LNKD-DOI:10.1145/218380. 218398; Aug. 6, 1995; pp. 39-46; XP000546214; ISBN: 978-0-89791-701-8.

Chai J-X et al; Plenoptic Sampling; Computer Graphics, Siggraph 2000 Conference Proceedings, New Orleans, LA; Jul. 23-28, 2000; New York, NY: ACM, US LNKD-DOI:10-1145/344779.344932, Jul. 23, 2000; pp. 307-318; XP001003569; ISBN: 978-1-58113-208-3.

* cited by examiner

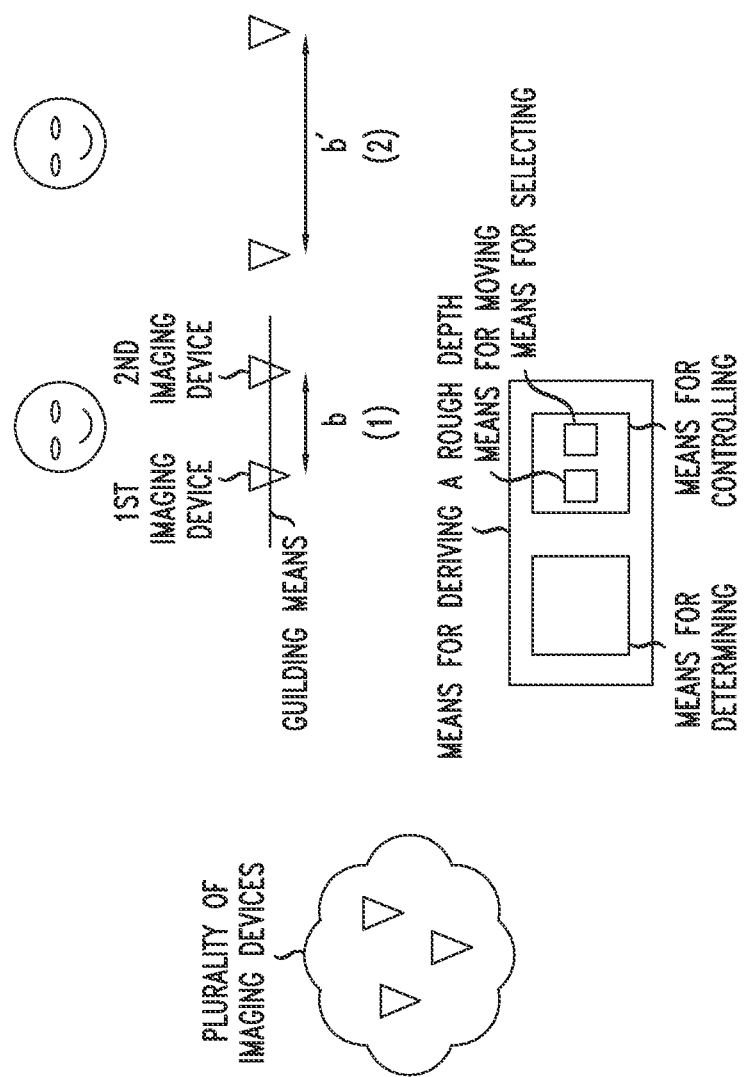

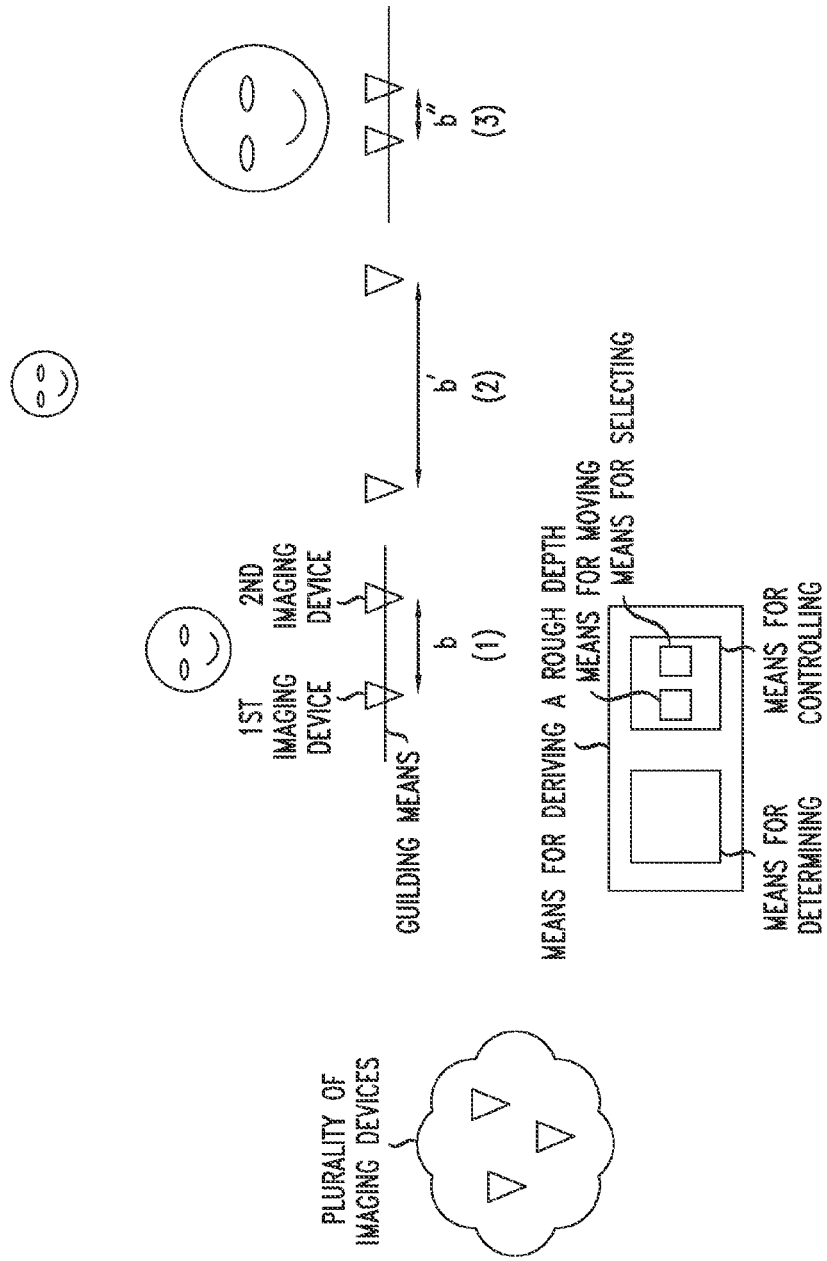

METHOD AND SYSTEMS FOR OBTAINING AN IMPROVED STEREO IMAGE OF AN OBJECT

TECHNICAL FIELD

The present disclosure relates to the field of methods and devices for obtaining stereo image information for an object of interest.

BACKGROUND

Stereo-cameras exist, which are able to derive three dimensional (3D) information of an object.

In state of the art stereo-camera systems, the distance between the multiple cameras is fixed.

As objects can though be moving around in the captured scene, the depth of the object can often not be measured with optimal precision.

Moreover the state of the art methods and systems require excessive amount of cameras in their stereo-camera set-up and a lot of processing power.

SUMMARY OF THE INVENTION

It is an object of the present invention to provide methods and systems for obtaining an improved depth precision for a stereo image of an object of interest.

This is achieved by aspects of the present invention.

According to a first aspect of the present invention, a method is described for obtaining an improved depth precision for a stereo image of an object of interest, comprising:
  imaging a first image of the object of interest from a first position;
  imaging a second image of the object of interest from a second position different from the first position;
wherein the method comprises
  determining a rough estimate of the depth for the object of interest, based on the first image and the second image;
  determining an improved set of imaging positions corresponding to an improved depth precision for the object of interest, based on the rough estimate of the depth;
  imaging improved images from the improved set of imaging positions;
  determining an improved depth based on the improved images.

An imaging position preferably corresponds to the position of the focal point of a camera. The distance between two cameras can be defined as the distance between their respective focal points (also referred to as baseline distance or baseline).

The depth is the distance between the object of interest and a straight line connecting the first and second imaging positions.

According to preferred embodiments, determining the rough estimate of the depth is based on the distance between the first and the second position, and disparity, being the difference in projected 2D image location of the 3D object of interest between the first image and the second image. Disparity refers to the difference in 2D image location after projection of the 3D real-world object (or point) on the image planes of the two cameras; the difference originating from the variable distance between the two camera focal point.

According to preferred embodiments the rough estimate of the depth can be derived as $z = b \cdot f / d$, with b being the distance along the baseline between the cameras, f being the focal length, and d being the disparity.

Cameras in a stereo set-up typically have substantially the same focal length. Image rectification also makes that the rectified images look as if they were made by a camera with the same focal length.

Disparity is measured in discrete steps (for instance per pixel/group of pixels). The difference in depth corresponding to two successive disparity steps is called the depth precision.

The difference between two successive depth values, corresponding to two successive possible disparity values, is not equal over the entire range of possible disparity values. As disparity is measured in discrete steps, depth can also only be measured in discrete steps. The uncertainty of each depth value (z), corresponding to disparity value (d), is given by the distance of this depth value (z) to the closest possible depth values below (z', corresponding to disparity d'=d+1) and above (z", corresponding to disparity d"=d−1) this depth value (z). This uncertainty determines how accurate a depth can be measured, and thus determines the depth precision.

According to preferred embodiments, the improved set of imaging positions comprises at least one of the first position or the second position.

According to preferred embodiments, the imaging positions of the improved set of imaging positions are along a straight line connecting the first position with the second position.

According to preferred embodiments, imaging the first image and imaging the second image is performed by a first and a different second camera respectively.

According to preferred embodiments, at least one of the first and the second camera is being moved in order to bring the first and the second camera in the improved imaging positions. The method then preferably comprises imaging the object of interest from the set of improved imaging positions by the first and the second cameras.

According to preferred embodiments, the method comprises selecting a set of two cameras out of a plurality of cameras, bringing the set of two cameras in correspondence with the improved set of imaging positions, and imaging said object of interest from the improved set of imaging positions by the set of two cameras.

According to preferred embodiments, the method comprises selecting a set of two cameras, a third camera and a fourth camera out of a plurality of cameras at fixed positions, the plurality of cameras comprising the first and the second camera, based on the positions of the plurality of cameras and on the improved set of imaging positions, and imaging the object of interest from the selected two cameras. Preferably the cameras which are nearest to the respective improved imaging positions can be selected. The third and fourth cameras can comprise the first and/or the second camera.

In any of the embodiments of the present invention, stereo image rectification for the first and second images can be performed.

Stereo image rectification is the process of reprojecting the captured images onto a common image plane, parallel to the line between the optical centers. The important advantage of stereo image rectification is that computing stereo correspondences is reduced to a 1-D search problem. Corresponding points in the two rectified images (2D points corresponding to the same 3D object) will lie on the same line (have the same Y coordinate) in the two rectified images.

In any of the embodiments of the present invention, stereo image rectification for the improved images can be performed.

In any of the embodiments of the present invention, camera calibration of the respective cameras is preferably performed. Camera calibration is typically the process of determining the camera intrinsic and extrinsic parameters, describing the mapping from real-world 3D points to 2D points in the captured image.

According to a second aspect of the present invention, a system for obtaining a stereo image with improved depth precision of an object of interest, comprising:

a plurality of imaging devices comprising a first imaging device for taking a first image of the object of interest and a second imaging device for taking a second image of the object of interest;

a rough depth deriving means for deriving a rough depth for the object of interest, based on the first image and the second image;

a determining means for determining an improved set of imaging positions corresponding to improved depth precision for said object of interest, based on the rough depth;

a controlling means for controlling the plurality of imaging devices in reply to an improved set of imaging positions received from the determining means, to image the object of interest from locations corresponding to the improved set of imaging positions.

According to an embodiments of the invention, the controlling means comprises a means for moving the first and/or the second imaging device to the improved set of imaging positions. According to embodiments, the system comprises exactly two imaging devices.

According to embodiments of the present invention, the controlling means comprises a means for selecting a third and a fourth camera out of the plurality of imaging devices, and a means for moving said third and fourth cameras to the improved set of imaging positions.

According to an embodiment of the invention, the system can comprise more than two imaging devices (e.g. cameras) in the stereo-camera set-up. After determination of an improved set of camera positions, a set of two camera's can be selected out of the plurality of cameras, based on for instance the vicinity of the respective cameras to the optimized imaging positions, and/or non-obstruction considerations for the cameras to be moved with respect to the other cameras. After the selection of the set of two cameras out of said plurality of cameras, the third and/or fourth camera of the set can then be brought in correspondence with (can typically be moved to) the respective improved imaging positions.

The system can further comprise a guiding means along which at least one imaging device of the plurality of imaging devices can be guided. The guiding means can be positioned such that it corresponds to the first position and the second position. The guiding means is preferably straight. In another view, the guiding means can allow the movement of the at least first/and or second imaging device along a straight line. The guiding means can allow the movement of all imaging devices of the plurality of imaging devices. This can be preferably along a straight line.

According to another embodiment of the present invention, each of the plurality of imaging devices is located at fixed positions; and the controlling means comprises a selecting means for selecting two imaging devices out of the plurality of imaging devices, the positions of which correspond best to the improved set of imaging positions.

According to preferred embodiments of the present invention, each of the plurality of imaging devices is located along a straight line.

The methods and systems can also be used for multiple objects of interest in the captured scene. The different objects of interest can be dealt with by applying the methods disclosed relating to a single object of interest in parallel for different objects. The method can then be applied by using a single system according to the second aspect of the present invention which comprise more then 2, for instance 3 or 4, cameras or by a plurality of such systems. For instance when two objects of interest are involved, a single system can be used comprising 4 cameras, wherein a first subsystem of 2 cameras can be associated to the first object of interest, and a second subsystem of 2 cameras can be associated to the second object of interest.

Further aspects of the present invention are described by the dependent claims. Features of the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

FIG. 4 provides a schematic representation of aspects of the present invention, in which the distance between two imaging positions is varied to improve the depth precision.

FIG. 5 provides a schematic representation of aspects of the present invention, in which the distance between two imaging positions is varied to improve the depth precision, for an object of interest which is moving around in a scene.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting.

Typically the precision of depth measurement is not evenly distributed over the entire depth range. In the state of the art, it is therefore quite likely that the depth of the object of interest (e.g. the face of a person during a videoconference, or the person's body during a presentation) is not measured with the optimal depth precision, as the object of interest can be moving around in the captured scene.

A preferred embodiment of the present disclosure comprises a basic stereo-camera set-up adapted for extracting depth for the entire captured scene. Because the stereo-camera set-up is potentially not yet focused on the object-of-interest, it is fairly possible that the depth of the object-of-interest is not captured with the optimal precision. By automatically adjusting the distance between the cameras in the stereo-camera set-up, one can automatically adjust the depth range at which the depth of the object-of-interest is measured with an optimal precision. The initial and rough estimation of the depth is used as an initial indicator as to where the object-of-interest is residing, and as a consequence where the optimal precision in depth measurement is required. According to preferred embodiments the set-up is iteratively adjusted so as to result in the optimal depth precision for the object-of-interest.

According to preferred embodiments the stereo-camera set-up can continuously adjust while tracking the object-of-interest to keep these in the depth range with optimal precision.

Figure 1:
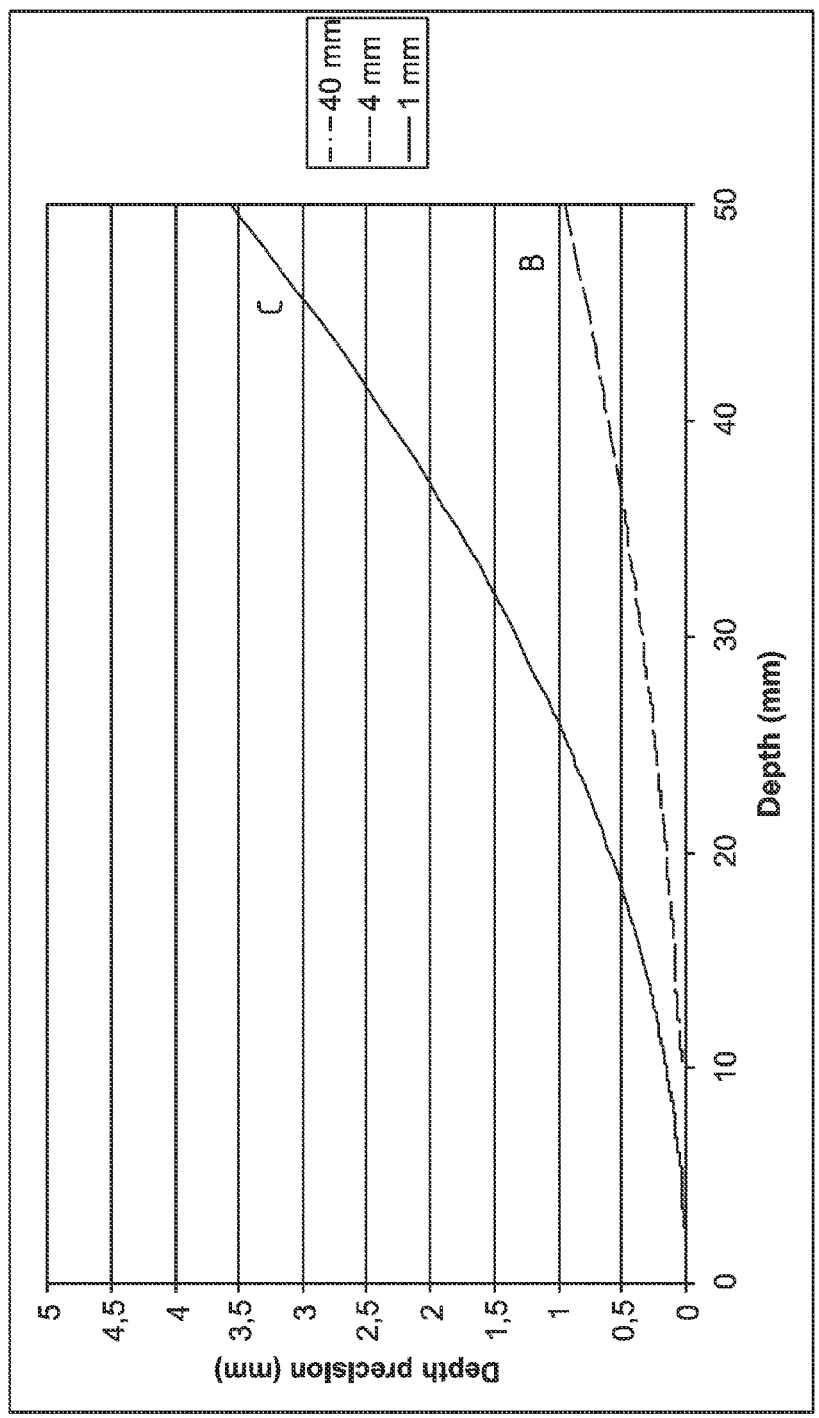
FIG. 1, FIG. 2 and FIG. 3 provide graphs illustrating the evolution of the depth precision parameter as a function of depth of the object of interest, for different distances between two camera centers.
Figure 2:
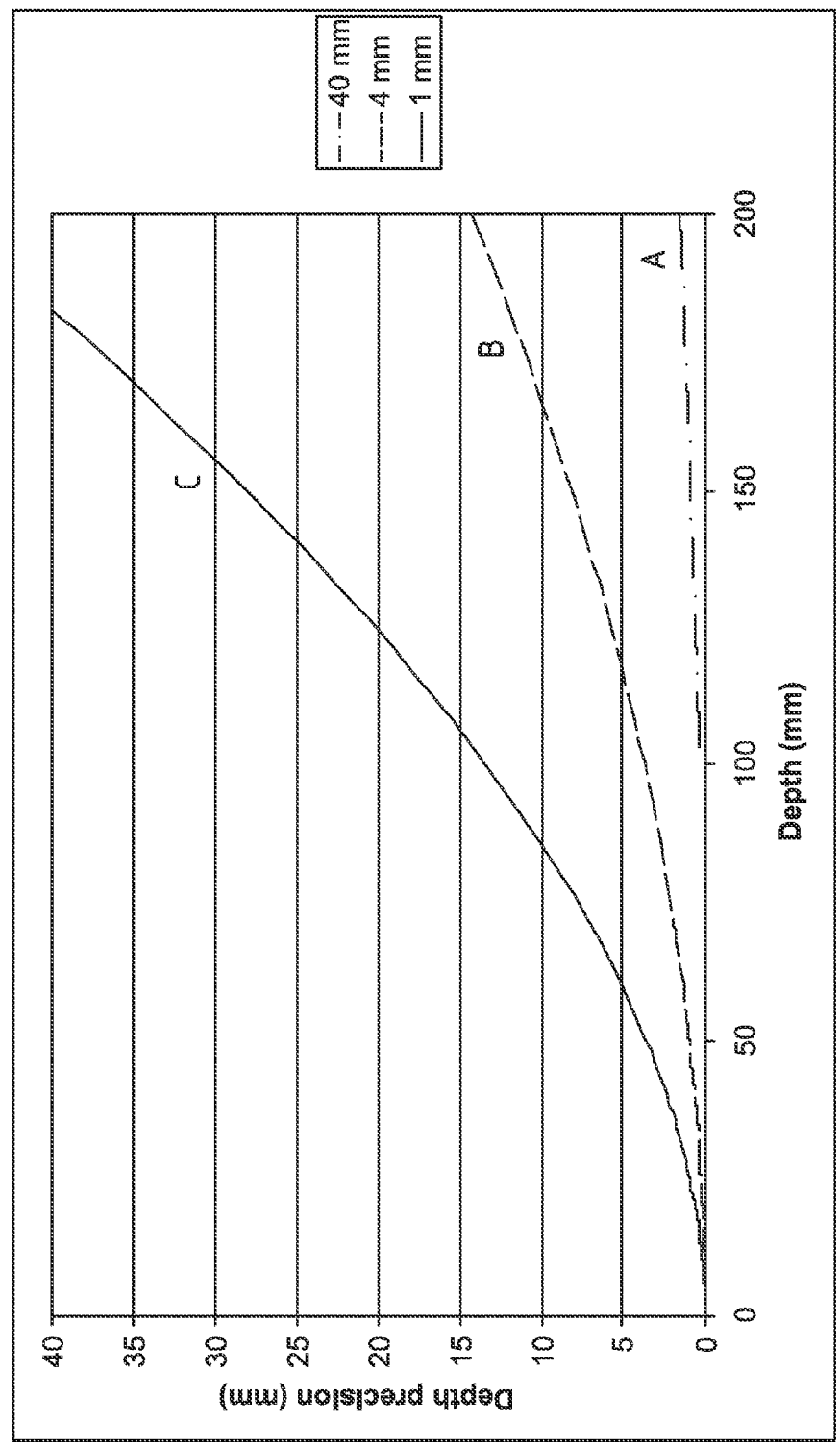
Figure 3:
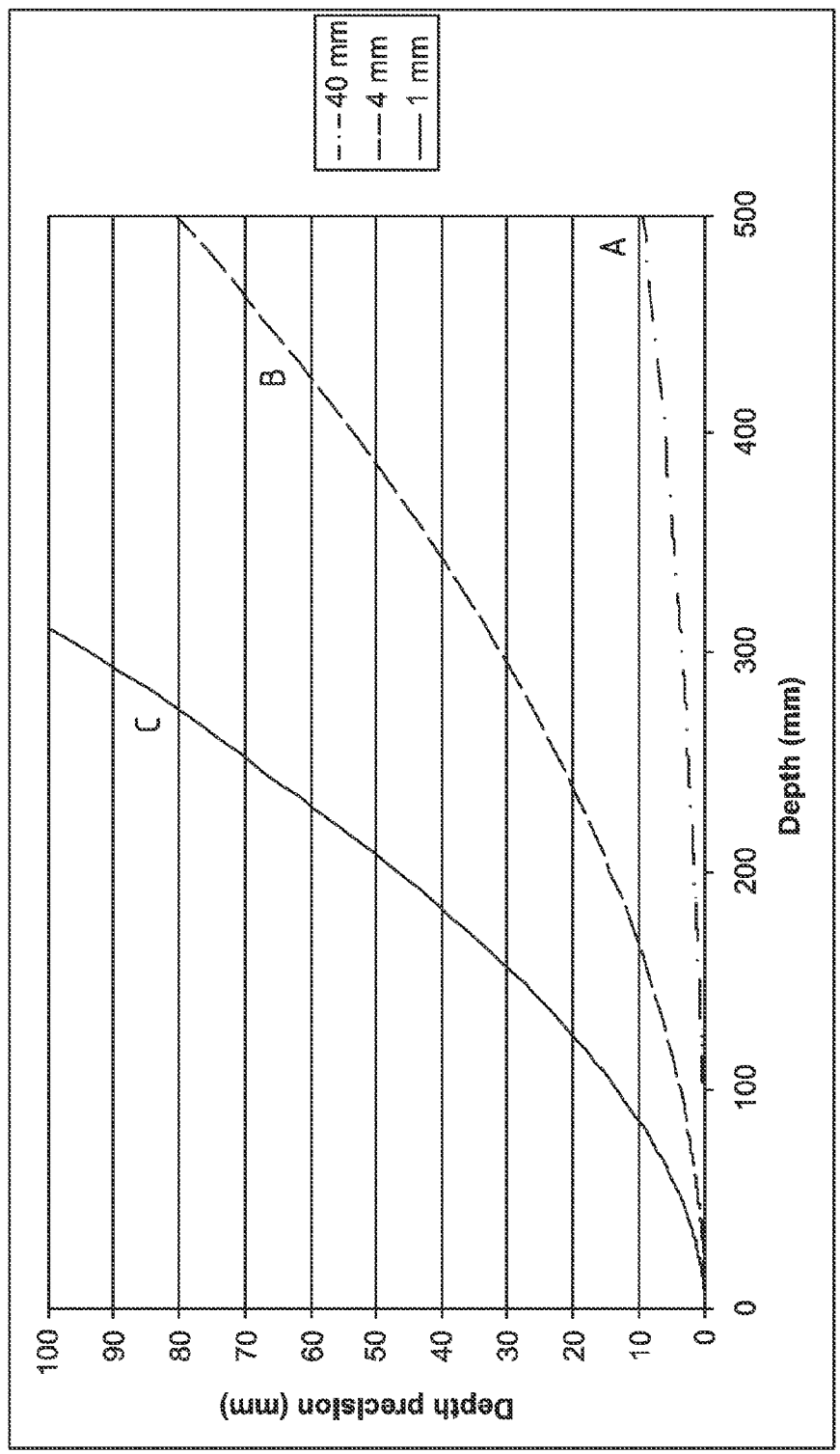

The theoric model is illustrated in the graphs of FIGS. 1-3. In these graphs the relation between depth precision and depth is illustrated for different baseline distances (A, B and C; corresponding to 40 mm, 4 mm and 1 mm respectively). The figures indicate that in a stereo-camera set-up the precision in depth measurement is not evenly distributed over the entire depth range and is dependent of the distance between the cameras in the stereo-camera set-up. The graphs differ in the depth range depicted on the X-axis (FIG. 1: 0-50 mm; FIG. 2: 0-200 mm; FIG. 3: 0-500 mm). As shown for instance in FIG. 1, for larger depth values line B exhibits a better (lower) depth resolution (higher precision) than line C. This means that for measuring larger depth values, one can increase the distance between the cameras in the stereo-camera set-up (in this case from 1 mm—line C—to 4 mm—line B). Note that line B stops at a small depth value of about 10 mm. This is partly because in the set-up according to line B the cameras are too widely placed, such that nearby objects are not visible in both cameras of the stereo-camera set-up and therefore a depth measure cannot be made.

Another reason for changing the baseline may be a loss in precision by illumination changes, or by parts of the nearby objects being occluded. In this case one may need to use a smaller distance between the cameras in the stereo-camera set-up. One can for instance use the set-up according to line C.

The figures are based on the relationship described below. Two cameras provide two images of a scene, which are at least overlapping and which both comprise the object of interest. Preferably the images comprise at least some common features of the object of interest.

The object of interest can be recognized as 2D-points m and m' in the images of the first and second camera respectively. The 3D coordinates of the 3D-point M corresponding to the real position of the object of interest, relative to some global reference system, can then be calculated.

Assume coordinates (x,y) for 2D point m and coordinates (x',y') for corresponding 2D point m'. After stereo rectification of the images, y and y' can be brought into correspondence, and the disparity is given by $d=|x-x'|$. The depth z is then given by $z=(b*f)/d$, wherein b is the baseline between the cameras and f is the focal length obtained after rectification of the images. The focal length $f=resolution/2\tan(\Omega/2)$, wherein $\Omega$ represents the field of view. In photography, the field of view describes the annular extent of a given scene that is imaged by a camera (is also known as angle of view).

A further illustration is provided in FIG. 4, showing a stereo-camera (i.e., first imaging device and second imaging device) with an initial set-up (1). The figure also shows one of the images taken by one of the two cameras in the stereo-camera, with the object-of-interest being a face of a person. The object-of-interest can be detected and indicated by state of the art recognition techniques, for instance face-recognition techniques. Also, a guiding means is provided along which at least one of the imaging devices can be guided. The initial set-up (1) of the stereo-camera is however insufficient for an optimal depth measurement of the object-of-interest. The optimal precision of the depth measurement of the current set-up (1) of the stereo-camera is located in a depth range different from the range in which our object-of-interest is residing. However, the current set-up (1) with baseline b provides for a rough estimate of the depth of the object-of-interest, so that the stereo-camera set-up can be automatically adjusted to a set-up (2) which provides for a better or even optimal depth precision in the depth range in which the object-of-interest is residing. The depth range in which the new set-up (2) with baseline b' of the stereo-camera exhibits its optimal precision in depth measurement now better matches the depth range in which the object-of-interest is residing, therefore leading to an accurate depth measurement in the areas of the captured scene where it is required.

If an object-of-interest, e.g. a person, is moving around in the scene, as illustrated in FIG. 5, corresponding adjustments of the distance between the cameras can be necessary. For instance setup (1) can be modified towards setup (2), by increasing baseline distance b to b' (b'>b), when person moves further away from the cameras. Setup (2) can again be modified towards setup (3), by again decreasing the baseline distance b' to b'' (b''<b') when person moves closer to cameras. If the person comes closer than in setup (1), the baseline distance b'' will be smaller than b (b''<b).). The object-of-interest can for instance be a person leaning forward and backward on his chair. By tracking (or predicting) the location of the object-of-interest in the captured scene using state of the art object-recognition and tracking techniques, and by, for instance automatically, adjusting the stereo-camera set-up, the depth range which exhibits the optimal precision in depth measurement can be kept consistent with the movement and location of the object-of-interest in the scene.

Embodiments according to the present disclosure allow for the capturing of the object-of-interest in a scene with an optimal precision in depth measurement, wherever the object is residing in the scene, and independent of the movement of the object-of-interest in the scene. When the object of interest comes closer, the distance between the cameras is decreased. When the object of interest moves further away, the distance between the cameras is increased.

An excessive amount of cameras and processing power is hereby not required.

The method for obtaining an improved depth precision for a stereo image of an object of interest, further comprising selecting a set of two cameras out of a plurality of cameras, bringing said set of two cameras in correspondence with said improved set of imaging positions, and imaging said object of interest from said improved set of imaging positions by said set of two cameras.

The method for obtaining an improved depth precision for a stereo image of an object of interest, further comprising selecting a third and a fourth camera out of a plurality of cameras at fixed positions, based on the positions of said plurality of cameras and on said improved set of imaging positions, and imaging said object of interest from the selected two cameras.

A system for obtaining a stereo image with improved depth precision of an object of interest, comprises a plurality of imaging devices comprising a first imaging device configured to take a first image of the object of interest and a second imaging device configured to take a second image of the object of interest; means for deriving a rough depth for said object of interest based on said first image and said second image; means for determining an improved set of imaging positions corresponding to improved depth precision for said object of interest based on said rough depth; and means for controlling said plurality of imaging devices in reply to an improved set of imaging positions received from said means for determining, to image said object of interest from locations that correspond to said improved set of imaging positions.

The system for obtaining the stereo image with improved depth precision of the object of interest, wherein said means for controlling comprises a means for moving said first and/or said second imaging device to said improved set of imaging positions.

The system for obtaining the stereo image with improved depth precision of the object of interest, wherein said means for controlling comprises a means for selecting a third and a fourth camera out of said plurality of imaging devices, and a means for moving said third and fourth cameras to said improved set of imaging positions.

The system for obtaining the stereo image with improved depth precision of the object of interest, further comprising a guiding means along which at least one of said plurality of imaging devices can be guided.

The system for obtaining the stereo image with improved depth precision of the object of interest, wherein each of said plurality of imaging devices is located at fixed positions; said means for controlling comprising means for selecting two imaging devices out of said plurality of imaging devices, the positions of which correspond best to said improved set of imaging positions.

While some embodiments described herein include some but not other features included in other embodiments, combinations of features of different embodiments are meant to be within the scope of the invention, and form different embodiments, as would be understood by the skilled person.

While the principles of the invention have been set out above in connection with specific embodiments, it is to be clearly understood that this description is merely made by way of example and not as a limitation of the scope of protection which is determined by the appended claims.

The invention claimed is:

1. A method for obtaining an improved depth precision for a stereo image of an object of interest, comprising:
    imaging a first image of said object of interest from a first position;
    imaging a second image of said object of interest from a second position different from said first position;
    determining a rough estimate of a depth for said object of interest based on the first image and the second image;
    determining an improved set of imaging positions corresponding to an improved depth precision for said object of interest based on said rough estimate of said depth;
    imaging improved images from said improved set of imaging positions; and
    determining an improved depth based on said improved images.

2. The method according to claim 1, wherein determining said rough estimate of said depth is based on the distance between said first and said second position, and disparity, being the difference in image location of said object of interest between the first image and the second image.

3. The method according to claim 1, wherein said improved set of imaging positions comprises at least one of said first position or said second position.

4. The method according to claim 1, wherein the imaging positions of said improved set of imaging positions are along a straight line connecting said first position with said second position.

5. The method according to claim 1, further comprising imaging said first image and said second image by a first and a different second camera.

6. The method according to claim 5, further comprising selecting a set of two cameras out of a plurality of cameras, bringing said set of two cameras in correspondence with said improved set of imaging positions, and imaging said object of interest from said improved set of imaging positions by said set of two cameras.

7. The method according to claim 5, further comprising moving at least one of said first and said second camera and imaging said object of interest from said improved set of imaging positions by said first and said second cameras.

8. The method according to claim 5, further comprising selecting a third and a fourth camera out of a plurality of cameras at fixed positions, based on the positions of said plurality of cameras and on said improved set of imaging positions, and imaging said object of interest from the selected two cameras.

9. The method according to claim 1, further comprising stereo image rectification for the first and second images.

10. The method according to claim 1, further comprising stereo image rectification for the improved images taken from said improved set of positions.

11. A system for obtaining a stereo image with improved depth precision of an object of interest, comprising:
    a plurality of imaging devices comprising a first imaging device configured to take a first image of the object of interest and a second imaging device configured to take a second image of the object of interest;
    means for deriving a rough depth for said object of interest based on said first image and said second image;
    means for determining an improved set of imaging positions corresponding to improved depth precision for said object of interest based on said rough depth; and
    means for controlling said plurality of imaging devices in reply to an improved set of imaging positions received from said means for determining, to image said object of interest from locations that correspond to said improved set of imaging positions.

12. The system according to claim 11, wherein said means for controlling comprises a means for moving said first and/or said second imaging device to said improved set of imaging positions.

13. The system according to claim 11, wherein said means for controlling comprises a means for selecting a third and a fourth camera out of said plurality of imaging devices, and a means for moving said third and fourth cameras to said improved set of imaging positions.

14. The system according to claim 11, further comprising a guiding means along which at least one of said plurality of imaging devices can be guided.

15. The system according to claim 11, wherein each of said plurality of imaging devices is located at fixed positions; said means for controlling comprising means for selecting two imaging devices out of said plurality of imaging devices, the positions of which correspond best to said improved set of imaging positions.

* * * * *